United States Patent [19]

Mallinson

[11] Patent Number: 5,146,527
[45] Date of Patent: Sep. 8, 1992

[54] OPTICAL FIBRE SPLICE

[75] Inventor: Stephen R. Mallinson, Ipswich, England

[73] Assignee: British Telecommunications public limited company, London, England

[21] Appl. No.: 401,406

[22] Filed: Sep. 1, 1989

[30] Foreign Application Priority Data

Sep. 1, 1988 [GB] United Kingdom ............... 8820662

[51] Int. Cl.⁵ .............................................. G02B 6/38
[52] U.S. Cl. ....................................... 385/98; 385/96; 385/97
[58] Field of Search ............. 350/96.20, 96.21, 96.15; 385/95, 96, 97, 98, 99

[56] References Cited

U.S. PATENT DOCUMENTS

| | | | |
|---|---|---|---|
| 4,199,223 | 4/1980 | Yannoni | 350/96.21 |
| 4,345,137 | 8/1982 | Mignien et al. | 350/96.20 X |
| 4,548,630 | 10/1985 | Biedka | 350/96.21 X |
| 4,636,033 | 1/1987 | Gagen | 350/96.21 |
| 4,737,006 | 4/1988 | Warbrick | 350/96.21 X |
| 4,810,054 | 3/1989 | Shinbori et al. | 350/96.20 X |
| 4,848,999 | 7/1989 | Taylor | 350/96.15 X |
| 4,923,273 | 5/1990 | Taylor | 350/96.21 |
| 4,957,343 | 9/1990 | Sato et al. | 350/96.21 |
| 4,971,418 | 11/1990 | Dorsey et al. | 350/96.21 |

FOREIGN PATENT DOCUMENTS

| | | |
|---|---|---|
| 0000145 | 1/1979 | European Pat. Off. . |
| 9213315 | 3/1987 | European Pat. Off. . |
| 2445972 | 1/1979 | France . |
| 2039378 | 8/1980 | United Kingdom . |
| 88/03661 | 5/1988 | World Int. Prop. O. . |

OTHER PUBLICATIONS

Applied Optics, vol. 23, No. 15, Aug. 1, 1984, pp. 2654–2659 "Arc fusion splicing of single mode fibres" by Kato et al.
Review of the Electrical Communication Laboratories, vol. 31, No. 3, 1983, pp. 282–289. "arc fusion splice of single-mode fibre cables" by Kato et al.
Patent Abstracts of Japan, vol. 4, No. 70 (P-12) [552], 23rd May 1980; and JP-A-55 36 820 (Nippon Deshin) and English translation.
Patent Abstracts of Japan, Band 10, Nr. 7 (Q-419) [2064], 11th Jan. 1986; and JP-A-60 164 705 (Fujitsu) and English translation.
Patent Abstracts of Japan, vol. 7, No. 117 (P-198) [1262v; and UP-A-58 37 613 (Fujitsu) and English translation.
JTR Japan Telecommunications Review, vol. 27, No. 4, Oct. 1984, pp. 245–249, Tokyo, JP; T. Uenoya: "SM optical fiber splicing technique".

Primary Examiner—Akm E. Ullah
Assistant Examiner—Phan T. Heartney
Attorney, Agent, or Firm—Nixon & Vanderhye

[57] ABSTRACT

A method of forming low loss splices between single-mode optical fiber ends involves taking prepared fiber ends and aligning the one with the other by inserting them into opposite ends of the bore of a ferrule, and fusing the fiber ends together by applying thermal energy thereto by means of an aperture in the wall of the ferrule. Splices prepared in this way have losses of less than 0.5 dB. The use of a precisely dimensioned ceramic ferrule enables the use of splicing apparatus which does not incorporate means for 3-dimensional micromanipulation.

22 Claims, 3 Drawing Sheets

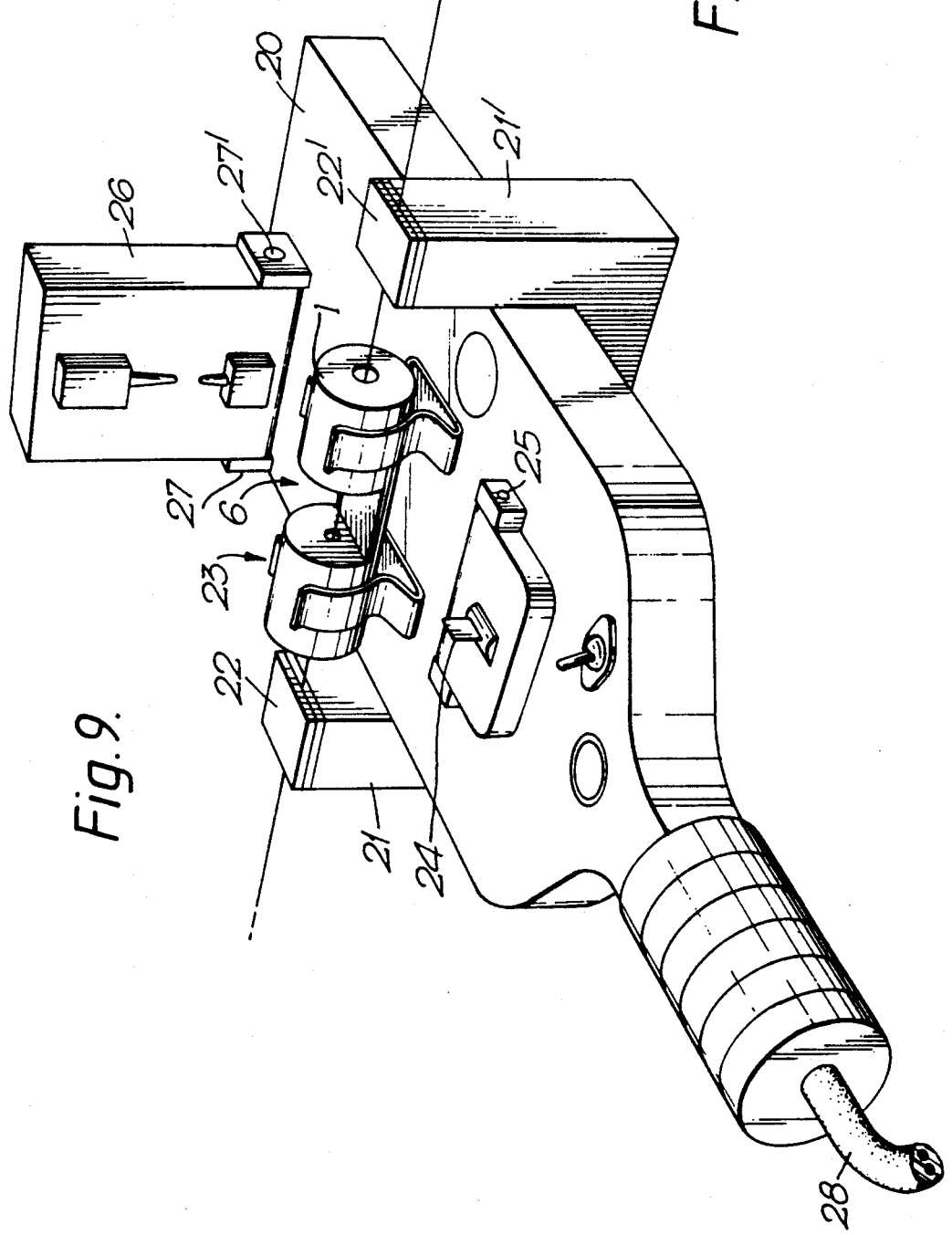

OPTICAL FIBRE SPLICE

BACKGROUND OF THE INVENTION

1. Field of the Invention

This invention relates to a method of forming a splice between two single-mode optical fibre ends and to splices so formed.

2. Description of Related Art

There are many situations where it is necessary to form low loss joints between optical fibre ends. Such situations occur for example anywhere in a telecommunications network where lengths of optical fibre cable have to be joined together or to line equipment such as exchanges, distribution points, etc. In addition to such joints having to be low loss, that is generally no more than 0.5 dB per joint, preferably no more than 0.2 dB, it is necessary that the joints be of low cost. These two requirements dictate that joints only be made demountable where this is a positive requirement. Non demountable joints are referred to as splices and are formed by fusing or gluing the aligned fibre ends together. The difficulty in making low loss fibre splices is that very precise alignment is required, particularly with single-mode fibres, which typically have an overall diameter of about 125 $\mu$m but a light carrying core diameter of only about 8 $\mu$m. In order to achieve the desired accuracy of alignment, splicing machines are equipped with micromanipulators capable of providing precise positional adjustment in three dimensions. The resultant bulk of the machines severely limits their use in confined spaces.

SUMMARY OF THE INVENTION

The present invention seeks to overcome some of the disadvantages of known splicing techniques and in particular seeks to avoid the need actively to adjust the position of the fibre ends in three-dimensions prior to splicing.

According to a first aspect the present invention provides a method of forming a low-loss splice between two single-mode optical fibre ends, the method comprising the steps of:
i) taking prepared fibre ends and aligning them one with the other by inserting them into opposite ends of the bore of a ferrule; and
ii) fusing together the fibre ends by applying thermal energy thereto by means of an aperture in the wall of the ferrule.

Surprisingly we have discovered that it is possible to make low loss splices, that is those exhibiting an optical loss of less than 0.5 dB, typically about 0.2 dB, from single-mode fibre without ensuring precise fibre end alignment in three dimensions prior to fusing the ends together. While the ferrules used in our invention are accurately formed with fine tolerances, it is still very surprising that such low losses can be achieved with single-mode fibres given the magnitude of the misalignment which can be expected in view of the tolerance on fibre diameter and ferrule bore dimensions, particularly in view of the apparent need for precise alignment in 3-dimensions as exemplified by the almost universal current use of 3-dimensional micromanipulation to achieve the accurate alignment prior to fusion of the fibre ends.

Previously it had been assumed that this type of splicing technique is only suitable for splicing graded-index fibre, that is fibre with relatively large core diameters, typically 50 $\mu$m diameter, which support several guided modes. Such fibre is also known as multi-mode fibre. Despite the fact that essentially the same technique was proposed by the Japanese for use with multi-mode fibres, it was not appreciated that the technique could be made to work with single mode fibres and produce low loss, i.e. less than 0.5 dB, splices.

BRIEF DESCRIPTION OF THE DRAWINGS

Preferred embodiments of the invention will now be described by way of example only, with reference to the accompanying drawings in which:

FIG. 9 shows diagrammatically an embodiment of splicing equipment according to the invention;

FIG. 10 illustrates a heat shrink over the enclosure of FIG. 6.

DESCRIPTION OF THE PREFERRED EMBODIMENTS

Figure 1:
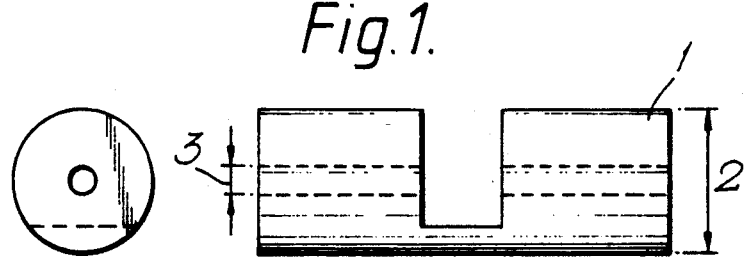
FIG. 1 shows diagrammatically side and end elevations of a ferrule for use in the method according to the invention.

At the heart of the invention is a ferrule having a very accurately dimensioned bore as shown in FIG. 1. Typically the ferrule 1 would be 8 to 15 mm in length, circular in cross-section with about a 2 mm outside diameter 2 and 126 $\mu$m internal diameter 3. The tolerance on the internal diameter is no more than about 0.5 $\mu$m. The bore has a polished finish and is straight to within 2 $\mu$m. We have discovered that using such a ferrule to ensure alignment between the two fibre ends it is possible routinely to form low loss splices without the need for micromanipulation in three dimensions.

Suitable ceramic ferrules are manufactured in Japan and sold by Sancera, Adamant and Kyocera. The conventional use of such ferrules is for fibre alignment and retention of optical fibres in fibre submounts. Ferrules are available with bore diameters of 125, 126 and 127 $\mu$m, with a maximum tolerance of ±0.5 $\mu$m. Although the specified tolerance on the 125 $\mu$m O.D. of single-mode fibre is ±2 $\mu$m, it is typically manufactured with a 125 $\mu$m O.D. with a tolerance of ±0.5 $\mu$m. The ferrule size for a given fibre should be chosen such that the fibre fits the bore without significant lateral movement of the fibre in the bore being possible. Since one of the aims of the invention is to get away from a need to provide micromanipulator stacks for 3-dimensional movement, it is intended that lateral alignment of the unfused fibre ends when fully within the ferrule should be largely and preferably wholly unaffected by modest movement of the fibre ends outside the ferrule.

A lateral slot 1 mm wide and about 1.1 mm deep is machined, using conventional ceramic machining techniques, in the ferrule to enable heat to be applied to the fibre ends to effect fusion thereof within the ferrule.

Figure 2:
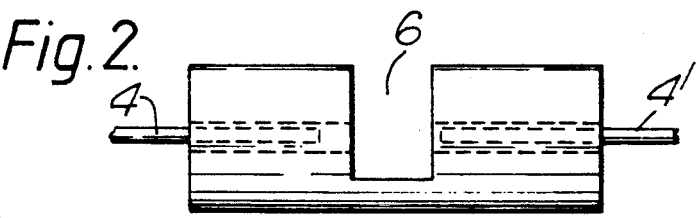
FIGS. 2 to 5 show diagrammatically various steps in the inventive method.
Figure 3:
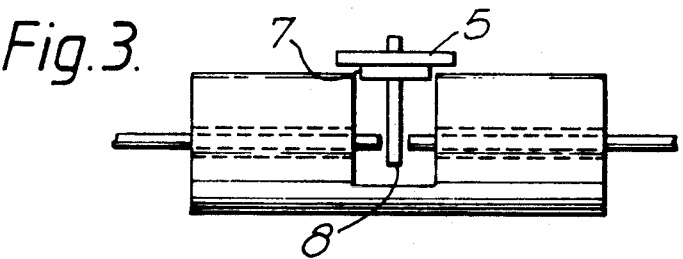

As shown in FIGS. 2 and 3, the prepared fibre ends 4, 4' are fed into opposite ends of the ferrule's bore. A temporary stop 5 is introduced through an aperture 6 in the sidewall of the ferrule and protrudes into the bore sufficiently far to act as a stop for both fibre ends. Preferably, as shown, the aperture 6 is so placed that the stop can be inserted about mid-way along the length of the ferrule. Preferably the stop 5 is provided with a flange 7 which engages with the walls of the aperture 6 to ensure that the position of the fibre ends abutted from against the stop is known relative to the rest of the ferrule.

Figure 4:
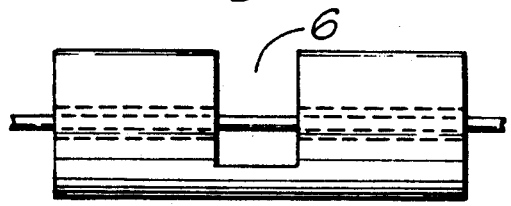
Figure 5:
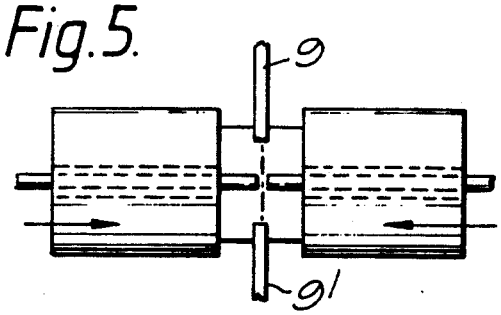
Figure 6:
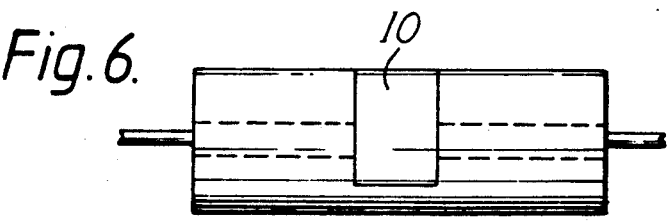
FIG. 6 shows diagrammatically a completed splice after potting.

The next method step is shown in FIGS. 4 and 5 and involves withdrawing the temporary stop 5 from the ferrule, driving the two fibre ends together, positioning electrodes 9,9' on either side of the ferrule, striking an arc between the electrodes 9,9' and fusing the fibre ends together. Fusing should be effected at a temperature high enough to enable surface-tension effects substantially to remove any lateral offset between the already well aligned fibre ends. With proper dimensional control, particularly of the stop blade 8, the two fibre ends can be brought together by a predetermined amount of axial movement, preferably supplied by a piezoelectric translator.

After fusing the fibres together, the electrodes are withdrawn and the splice potted in the ferrule using an epoxy or silicone resin 10. Finally, the ferrule and adjacent fibre portions are encased in a thermally shrunk-to-fit protective sheath 11 (see FIG. 10).

Figure 7:
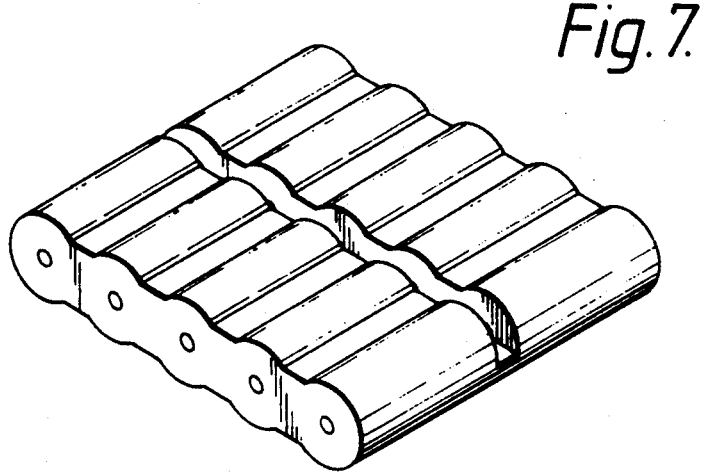
FIG. 7 shows diagrammatically a planar ferrule structure for use with a ribbon cable.
Figure 8A:
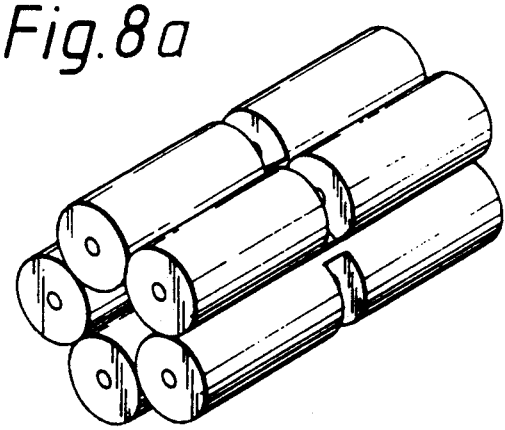
FIGS. 8a, 8b and 8c show diagrammatically ferrules with clustered multiple bores.
Figure 8C:
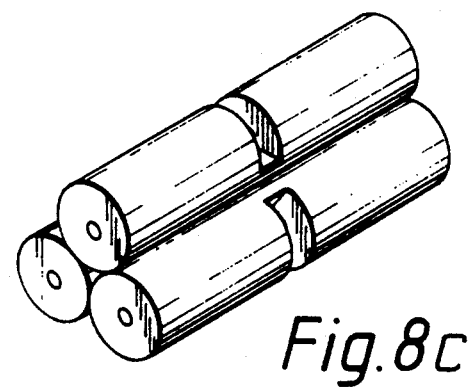
Figure 8B:
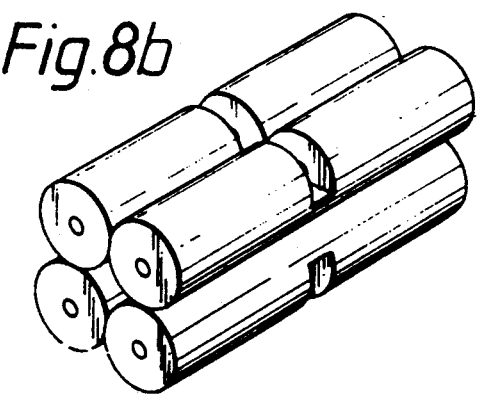

Although the invention has so far been described solely with reference to a single pair of fibre ends being spliced within a simple ferrule having just a single bore, clearly multiple bores could be provided to enable multiple splices to be produced in a single structure. The multiple bores could be arranged side-by-side to produce a planar structure suitable for use with ribbon cable, as shown in FIG. 7. Alternatively the multiple bores could be arranged in a cluster, as shown in FIGS. 8a–8c. Clearly, since the fibers are spliced while they are in the ferrule, provision must be made to enable the application of thermal energy to the fibres to effect fusion. In the clusters shown in FIGS. 8a–8c the ferrule bores are each located at a corner of the cluster, there being sufficient space between adjacent bores to enable a pair of electrodes to be introduced into the vicinity of the fibres to effect fusion. Of course alternative sources of thermal energy, such as lasers or flame, could be used in place of an electric arc to effect fibre fusion.

As a further variant, the ferrules could be made of a material other than a ceramic, although ceramics are preferred, provided a similar level of accuracy on bore dimensions is maintained. Potentially the ferrules could be made of a dimensionally stable thermoplastic or a metal. Of course it is important that the ferrule does not distort during the fibre fusion process so as to affect alignment.

An example of a compact fusion splicer suitable for use according to the invention is shown in FIG. 9. The fusion splicer comprises a baseplate 20 on which is mounted a piezoelectric translater, not shown, to which are connected arms 21, 21' at the ends of which are fibre clamps 22, 22'. Between and aligned with the fibre clamps is a ferrule clamp 23 which holds the ferrule firmly and precisely in place during the splicing operation. Adjacent the ferrule clamp 23 is the fibre stop assembly 24 which is pivotally mounted about a pair of supports 25 to enable it to be swung into engagement with the aperture 6 in ferrule 1. Also adjacent the ferrule clamp 23 but on the opposite side to the stop assembly 24 is the electrode assembly 26 pivotally mounted on supports 27,27'. An electrical umbilical, 28, connects the piezoelectric translator and the electrodes to the control electronics and the power supply which are housed remotely.

Optical fibre splices made according to the method of the invention routinely exhibit losses of 0.3 dB and have exhibited losses as low as 0.2 dB, although the realisation of such low losses is dependent on the prepared fibre ends having flat end faces orthogonal to the fibre axis, consequently care should be taken when cleaving the fibre ends in preparation for splicing.

I claim:

1. A method of forming a low-loss splice between two single-mode fibre ends, the method comprising the steps of:
   i) taking prepared fibre ends and aligning them one with the other by inserting them into opposite ends of the bore of a one-piece ferrule;
   ii) fusing together the fibre ends by applying thermal energy thereto via an aperture in the wall of the ferrule, and
   iii) maintaining the ferrule around the fused fibre ends thereby forming a protective sheath.

2. A method as claimed in claim 1 wherein the two fibre ends are fused together by means of an electric arc.

3. A method as claimed in any one of the preceding claims wherein the fibre ends are initially positioned within the bore against stop means, the stop means being withdrawn prior to the fibre ends being fused together.

4. A low-loss fibre splice made according to the method of any one of claims 1 or 2.

5. A fibre splice as claimed in claim 4 wherein the splice exhibits and optical loss of no more than 0.3 dB at an operative wavelength of the system in which it is to be used.

6. A fibre splice as claimed in claim 4 wherein the ferrule comprises a ceramic material.

7. Fusion splicing apparatus for forming low loss splices between single mode fibre ends, said apparatus comprising:
   a one-piece ferrule having a central bore therethrough, said ferrule including an aperture in a ferrule wall which communicates with said bore;
   said bore being sized to allow said fibre ends to be aligned one with the other when inserted into opposite ends of the bore; and
   a fuser for applying thermal energy to the fibre ends via said aperture for fusing the fibre ends together therewithin and leaving the ferrule disposed about the fused fibre to form a permanent protective sheath.

8. Fusion splicing apparatus as claimed in claim 7 comprising:
   i) ferrule retaining means; and
   ii) means to drive the fibre ends into the ferrule.

9. Apparatus for splicing together two ends of single mode optical fibres, said apparatus comprising:
   a clamp for releasably holding a ferrule having fixedly aligned bores on opposite sides of an opening partially extending through the ferrule;
   a temporary spacer movable into said opening against which said single mode fibre ends are to be butted via said bores before the spacer is withdrawn to leave a predetermined gap between the single mode fibre ends;
   fibre drivers aligned with said clamp for driving said single mode fibre ends towards one another after the spacer is withdrawn; and a fibre and fuser positioned to thermally use the fibre butt ends together within said opening.

10. A method for splicing together two ends of single mode optical fibres, said method comprising:

aligning the outer fibre surfaces of two single mode optical fibre ends which are to be butt-joined together by inserting each end through respective fixedly aligned bores in a unitary ferrule member having an opening between the bores in which opening the butt-ends to be joined are opposingly positioned;

fusing together the opposingly positioned fibre ends within said opening using a temperature sufficiently high to enable surface tension effects to substantially relieve any lateral offset of the fibre cores being joined.

11. A method as in claim 10 further comprising:

potting the fused fibre ends in situ within the ferrule opening to physically fix the fused ends permanently into place within the ferrule.

12. A method as in claim 11 further comprising:

encasing the ferrule and its included fused fibre ends within a surrounding outer protective sheath.

13. A method as in claim 10 further comprising:

encasing the ferrule and its included fused fibre ends within a surrounding outer protective sheath.

14. A method as in claim 12 wherein said encasing step includes installation of a thermally shrunk-to-fit protective sheath about the ferrule.

15. A method as in claim 13 wherein said encasing step includes installation of a thermally shrunk-to-fit protective sheath about the ferrule.

16. A method as in claim 15 further comprising the step of:

potting the fused fibre ends in situ within the ferrule opening to physically protect and permanently retain the fused ends therewithin.

17. A method for splicing together the ends of two single mode optical fibres, said method comprising the steps of:

inserting the cleaved end of a first single mode optical fibre into a first ferrule bore which substantially constrains fibre movement except in an axial direction;

inserting the cleaved end of a second single mode optical fibre into a second ferrule bore which substantially constrains fibre movement except in an axial direction, said first and second bores being fixedly axially aligned with each other in a common ferrule member at opposite sides of a ferrule bore access opening;

axially positioning the cleaved ends of said first and second single mode fibres within said opening into opposing juxtaposed position in readiness for forming a butt-joint splice therebetween; and fusing said juxtaposed ends together without any radial position control except that provided by the axially aligned bores of the ferrule and by surface tension effects during this fusing step.

18. A method as in claim 17 further comprising the step of:

encasing the ferrule and its included fused fibre ends within a thermally shrunk-to-fit protective sheath.

19. The single mode optical fibre splice product produced by the process of claim 10, 11, 12, 17, 16 or 18.

20. A single mode optical fibre splice comprising:

a one-piece ferrule having fixed axially aligned bores fixedly disposed on opposing sides of a central access opening; and a pair of single mode optical fibre ends extending through said axially aligned bores and fuse-spliced together within said opening.

21. A single mode optical fibre splice as in claim 20 further comprising:

potting material fixedly and permanently disposed within said opening and about said fuse-spliced optical fibre ends.

22. A single mode optical fibre splice as in claim 20 or 21, further comprising:

a protective sheath encapsulating said ferrule and the fuse-spliced optical fibre ends therewithin.

* * * * *